United States Patent [19]

Lange

[11] 4,025,936
[45] May 24, 1977

[54] AXIALLY DISPLACEABLE LENS HOUSING

[75] Inventor: Karl Heinz Lange, Bunde, Germany

[73] Assignee: Balde-Werke Photographische Gerate & Kunststoff GmbH & Co., Bunde, Germany

[22] Filed: Nov. 21, 1975

[21] Appl. No.: 634,218

[30] Foreign Application Priority Data

Mar. 14, 1975 Germany .................... 2511159

[52] U.S. Cl. .............................................. 354/286
[51] Int. Cl.² ........................................ G03B 17/00
[58] Field of Search ......... 354/202, 286; 350/252, 350/255, 257; 352/139, 140

[56] References Cited

UNITED STATES PATENTS

| 1,620,768 | 3/1927 | Joy | 352/140 |
| 2,305,160 | 12/1942 | Hansen | 354/202 |
| 3,594,068 | 7/1971 | Kirstein | 350/255 |
| 3,597,064 | 8/1971 | Caraway | 352/140 |
| 3,672,280 | 6/1972 | Imura | 350/255 UX |

Primary Examiner—Donald A. Griffin

Attorney, Agent, or Firm—Blum, Moscovitz, Friedman & Kaplan

[57] ABSTRACT

A camera housing of substantially conventional construction includes a lens housing guide member substantially normal to the camera housing along which the lens housing is slideably moveable. The lens housing includes means which cooperate with the guide member, the lens housing being axially displaceable relative to the camera housing along the guide member on the means. A biasing means connects the lens housing and the camera housing, and statically determines constant engagement between the guide member and means provided on the lens housing which cooperate therewith. A support bearing is journaled on a cam member which is mounted on the lens housing. The support bearing is slideable on a bearing surface provided in the camera housing. The camera housing includes a means having a camming surface which cams along the cam member on the lens housing so as to axially displace the lens housing relative to the camera housing along the guide member and against the bias provided by the biasing means.

13 Claims, 4 Drawing Figures

AXIALLY DISPLACEABLE LENS HOUSING

BACKGROUND OF THE INVENTION

The instant invention relates to a camera construction, and more particularly, to a lens housing for a camera, the lens housing for a camera, the lens housing being axially displaceable at a normal to the plane of a film operatively mounted in the camera housing.

Lens housings displaceable relative to the operative film plane in a camera are known. However, these prior lens housings are obliquely displaceable relative to the film plane of the camera. These prior displaceable lens housings are axially moveable on a pair of guide pins mounted on the camera housing and received in respective corresponding blind bores provided in the lens housings.

It is critical to the operation of these prior displaceable lens housings that exact correspondence be had among the guide pins and blind bores so that the moveably mounted lens housing is seated on the camera housing without any play between the lens housing and camera housing. The exact correspondence required among the camera housing guide pins and lens housing blind bores involves expensive precision manufacturing techniques. Even when these techniques are employed, the lens housing is often obliquely positioned relative to the film plane of the camera housing rather than being normally positioned relative thereto, as desired.

Accordingly, the instant invention provides means for moveably mounting a lens housing on a camera housing wherein the displaceable lens housing is substantially normal to the film plane in the camera housing. Moreover, the means provided has a simple construction, substantial reliability, and provides a play-free seating between the displaceable lens housing and the camera housing, which is relatively inexpensive.

SUMMARY OF THE INVENTION

Generally speaking, in accordance with the invention, a camera housing of substantially conventional construction includes a lens housing guide member substantially normal to the camera housing along which the lens housing is slideably moveable. The lens housing includes means which cooperate with the guide member, the lens housing being axially displaceable relative to the camera housing along the guide member on the means. A biasing means connects the lens housing and the camera housing, and statically determines constant engagement between the guide member and means provided on the lens housing which cooperate therewith.

A support bearing is journaled on a cam member which is mounted on the lens housing. The support bearing is slideable on a bearing surface provided in the camera housing. The camera housing includes a means having a camming surface which cams along the cam member on the lens housing so as to axially displace the lens housing relative to the camera housing along the guide member and against the bias provided by the biasing means.

Accordingly, it is an object of this invention to provide an improved camera construction having a displaceable lens housing.

Another object of this invention is to provide a novel construction for a displaceable lens housing.

A further object of the invention is to provide a displaceable lens housing wherein the lens housing has a statically axially determined mounting.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings in which.

DETAILED DESCRIPTION OF THE INVENTION

Figure 1:
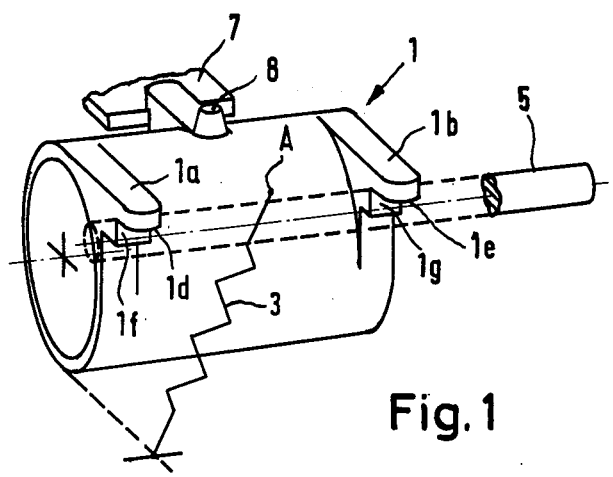
FIG. 1 is a perspective view of a lens housing constructed in accordance with the instant invention.
Figures 3, 4:
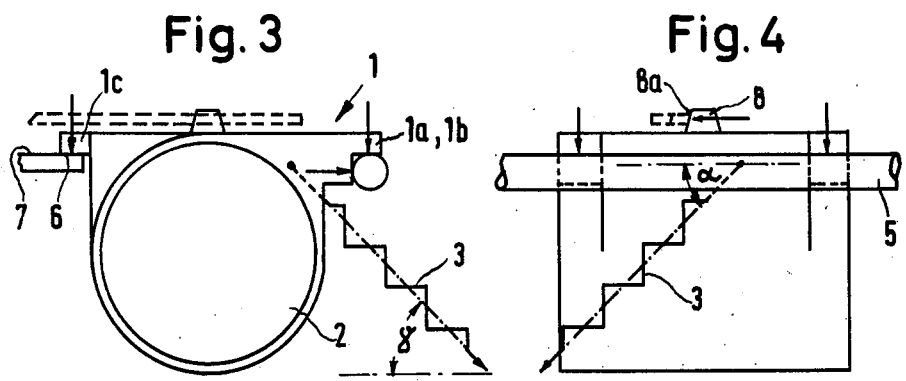
FIG. 3 is an elevated front view of the embodiment seen in FIG. 1.
FIG. 4 is an elevated side view of the embodiment seen in FIG. 1.

Referring now to the Figures, a lens housing generally designated by the numeral 1, is provided with parallel equilateral extension members, 1a and 1b, at opposite ends thereof. Extension members 1a and 1b extend unidirectionally from lens housing 1, and lens housing 1 is provided with a third extension member, 1c, extending substantially medianly from lens housing 1 oppositely in direction from extension members 1a and 1b. Extension members 1a and 1b are slideably mounted on a guide rod member 5, connected to the camera housing (not shown). Guide rod member 5 is mounted on the camera housing perpendicularly relative to the plane of a film frame operatively wound through the camera housing.

Extension member 1a includes a horizontal planar bearing surface, 1d, and a vertical planar bearing surface, 1f, which linearly intersects surface 1d thereof. Extension member 1b includes respective surfaces 1e and 1g, which correspond to the surfaces 1d and 1f in extension member 1a.

As lens housing 1 is axially slideably mounted on guide rod member 5, bearing surfaces 1d and 1e of respective members 1a and 1b overlie guide rod member 5 and surfaces 1f and 1g constantly abut against guide rod member 5 for thereby statically determining the juxtaposition of lens housing 1 to guide rod member 5.

Extension member 1c is a support bearing which is journaled on a trunion, 8, mounted on lens housing 1. Extension member 1c has a bearing surface, 6, slideable along a corresponding support plane, 7, provided in the camera housing.

A compression spring 3, is connected at one end, A, to the lens housing 1 and is connected at its other end to the camera housing. Spring 3 is connected to lens housing 1 in the area between extension members 1a amd 1b, and biases extension members 1a and 1b of lens housing 1 against guide rod member 5; and concomitantly, the connections of spring 3 to lens housing 1 and the camera housing provides a resultant force which urges bearing surface 6 of extension member 1c into sliding engagement against support plane 7.

Figure 2:
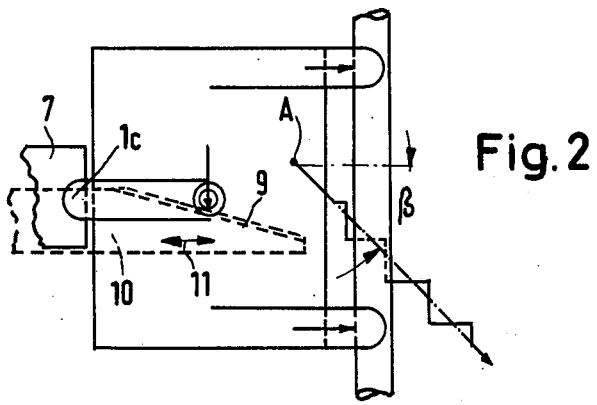
FIG. 2 is a plan view of the embodiment seen in FIG. 1.

Trunion 8 is provided with an inclined surface 8a and trunion 8 functions as a cam member for a distance adjusting lever, 10, connected to the camera housing. As best seen in FIG. 2, lever 10 overlies extension member 1c and includes a camming surface, g, which is angularly inclined and rides along the inclined surface, 8a of trunion 8. As lever 10 is adjusted, camming surface g thereof abutting against surface 8a of trunion 8 adjusts the axial displacement of lens housing 1 relative to the camera housing. Lever 10 may adjust the position of lens housing 1 inwardly or outwardly relative to the camera housing as seen by the double-headed arrow, 11.

In the embodiment illustrated, spring 3 is mounted between lens housing 1 and the camera housing to form a relatively sharp angle, $\alpha$, with the plane of support bearings 1a, 1b, and 1c of lens housing 1. Also as mounted, spring 3 defines defines a relatively sharp angle, $\beta$, with the plane of the film conventionally connected through the camera housing. Concomitantly a sharp angle, $\gamma$, is formed relative to a plane oriented horizontally and normal to the plane of the film connected through the camera housing.

Accordingly, it may be seen that in constructions within the scope of the invention, the bearing surfaces in the extension members 1a, 1b and 1c may be arranged at inclines to the plane of the support bearings and the inclinations in these surfaces are not critical. Whatever the incline provided in the support bearings, spring 3 provides a resultant force urging the respective support bearings against the respective support surfaces of guide rod member 5 and support plane 7.

Therefore the seating of the displaceable lens housing is play-free in its connection to the camera housing and the particular arrangement of surfaces 1d and 1f in extension member 1a and surfaces 1e and 1g in extension member 1b is not a critical feature of the invention.

It will thus be seen that the objects set forth above among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also understood that the following claims are intended to cover all of the generic and specific features of the invention herein described, and all statements of the scope of the invention which, as a matter of language, might be said to fall therebetween.

What is claimed is:

1. A mounting assembly for an axially displaceable lens housing on a camera housing comprising a lens housing guide member mounted on the camera housing along which the lens housing is slideably moveable, said lens housing guide member extending substantially normal to a plane through a film operatively mounted in the camera housing, the lens housing including first and second means cooperating with said guide member, the lens housing being axially displaceable relative to the camera housing along said guide member on said first and second means, biasing means connected to the lens housing and the camera housing for biasing the lens housing towards the camera housing, said biasing means statically determining a constant engagement between said guide member and said first and second means provided on the lens housing which cooperate therewith, a support bearing having a bearing surface, said support bearing being mounted on the lens housing, a support plane having a bearing surface, said support plane being provided in the camera housing, said support bearing being slideable on said support plane as the lens housing is axially displaced relative to the camera housing, a cam member mounted on the lens housing, and a means connected to the camera housing having a camming surface, said camming surface camming on said cam member on the lens housing so as to axially displace the lens housing relative to the camera housing along said guide member and against the bias provided by said biasing means.

2. The mounting assembly as claimed in claim 1, said cam member being a trunion having an inclined surface.

3. The mounting assembly as claimed in claim 1, said means connected to the camera housing having a camming surface being a distance adjusting lever for the lens housing.

4. A mounting assembly for an axially displaceable lens housing on a camera housing comprising a lens housing guide member mounted on the camera housing along which the lens housing is slideably moveable, said lens housing guide member extending substantially normal to a plane through a film operatively mounted in the camera housing, the lens housing including first and second means cooperating with said guide member, said first and second means in the lens housing comprising substantially parallel equilateral extension members, said extension members issuing unidirectionally from the opposite ends of the lens housing, the lens housing being axially displaceable relative to the camera housing along said guide member on said first and second means, and a biasing means connected to the lens housing and the camera housing for biasing the lens housing towards the camera housing, said biasing means statically determining a constant engagement between said guide member and said first and second means provided on the lens housing which cooperate therewith.

5. The mounting assembly as claimed in claim 4, said extension members each including respective intersecting horizontal and vertical bearing surfaces, each of said bearing surfaces constantly engaging said guide member.

6. A mounting assembly for an axially displaceable lens housing on a camera housing comprising a lens housing guide member mounted on the camera housing along which the lens housing is slideably moveable, said lens housing guide member extending substantially normal to a plane through a film operatively mounted in the camera housing, the lens housing including first and second means cooperating with said guide member, the lens housing being axially displaceable relative to the camera housing along said guide member on said first and second means, biasing means connected to the lens housing and the camera housing for biasing the lens housing towards the camera housing, said biasing means statically determining a constant engagement between said guide member and said first and second means provided on the lens housing which cooperate therewith, a support bearing having a bearing surface, said support bearing being mounted on the lens housing, said support bearing issuing substantially medianly from the lens housing, said support bearing being issued therefrom substantially oppositely in direction relative to said first and second means, and a support plane having a bearing surface, said support plane being provided in the camera housing, said support bearing being slideable on said support plane as the lens housing is axially displaced relative to the camera housing.

7. A mounting assembly for an axially displaceable lens housing on a camera housing comprising a bearing surface mounted in said lens housing, a guide member extending substantially normal to a plane through a film operatively mounted in said camera housing, said lens housing including first and second support means extending from said lens housing, said support means including means for establishing at least four points of contact with said guide member, third support means extending from said guide member oppositely in direction from said first and second guide members, said third support means having means for establishing a fifth point of contact with said bearing surface and means for biasing said first and second support means into contact with said guide member and for biasing said third support means into contact with said bearing surface.

8. The mounting assembly as claimed in claim 7, wherein two of said four points of contact of said first and second support means lie in planes extending substantially perpendicular to the planes of the other two of said points of contact.

9. The mounting assembly as claimed in claim 7, wherein each of said first and second support means comprise substantially unidirectional members each having two points of contact lying in planes perpendicular to each other and said two points of contact lying in planes substantially normal to the film plane.

10. The mounting assembly as claimed in claim 7, wherein said point of contact of said third support means lies in a plane parallel to the longitudinal axis of said lens housing.

11. The mounting assembly as claimed in claim 7, wherein said third support means is positioned intermediate said first and second support means in the direction along said guide member extends.

12. The mounting assembly as claimed in claim 11, wherein said cam comprises a member having an inclined surface abutting said cam follower, said cam being movably mounted on said camera housing.

13. The mounting assembly as claimed in claim 7, further including a cam follower mounted on said lens housing for cooperative interengagement with a cam mounted on said lens housing for axial displacement of said lens housing.

* * * * *